(12) United States Patent
Bushnell et al.

(10) Patent No.: US 10,576,792 B2
(45) Date of Patent: Mar. 3, 2020

(54) ALL-WEATHER TIRE

(71) Applicant: Innovative Technologies, LLC, Gladstone, OR (US)

(72) Inventors: Raymond B. Bushnell, Beaver Creek, OR (US); Bradley K. S. Larson, Beaverton, OR (US)

(73) Assignee: Innovative Technologies, LLC, Gladstone, OR (US)

( * ) Notice: Subject to any disclaimer, the term of this patent is extended or adjusted under 35 U.S.C. 154(b) by 799 days.

(21) Appl. No.: 15/012,588

(22) Filed: Feb. 1, 2016

(65) Prior Publication Data

US 2016/0167445 A1    Jun. 16, 2016

Related U.S. Application Data

(63) Continuation of application No. 13/971,598, filed on Aug. 20, 2013, now Pat. No. 9,278,584, which is a continuation-in-part of application No. 13/663,918, filed on Oct. 30, 2012, now Pat. No. 9,290,057.

(60) Provisional application No. 61/628,386, filed on Oct. 31, 2011.

(51) Int. Cl.
  *B60C 23/12*    (2006.01)
  *B60C 11/16*    (2006.01)
  *B60C 23/00*    (2006.01)
  *B60C 23/04*    (2006.01)

(52) U.S. Cl.
  CPC ........ *B60C 11/1612* (2013.01); *B60C 23/004* (2013.01); *B60C 23/0408* (2013.01); *B60C 23/12* (2013.01)

(58) Field of Classification Search
  CPC ..... B60C 23/001; B60C 23/004; B60C 23/10; B60C 23/12; B60C 11/1612
  USPC .................................................. 152/423–426
  See application file for complete search history.

(56) References Cited

U.S. PATENT DOCUMENTS

| 94,047 A | 8/1869 | Van Choate |
| 97,821 A | 12/1869 | Smoot |
| 325,369 A | 9/1885 | Updegraff |
| 558,167 A | 4/1896 | Field |
| 598,108 A * | 2/1898 | McCollum .............. B60C 23/12 152/426 |
| 648,464 A | 5/1900 | Mowry |
| 658,978 A | 10/1900 | Cyr et al. |
| 827,785 A | 8/1906 | Carey |
| 849,587 A | 4/1907 | Warwick |

(Continued)

FOREIGN PATENT DOCUMENTS

| DE | 2604633 | 8/1977 |
| DE | 102007018437 | 12/2007 |

(Continued)

*Primary Examiner* — Robert C Dye
(74) *Attorney, Agent, or Firm* — Klarquist Sparkman, LLP

(57) ABSTRACT

In one representative embodiment, a tire comprises an inner shell having a hollow interior space, an outer shell disposed radially outward from the inner shell, and at least one pump assembly disposed adjacent to the inner shell and having a compressible tube portion, wherein the tube portion of the pump assembly is configured to expand radially outwardly beyond the outer shell and to compress radially inwardly, and wherein the pump assembly is configured to direct a fluid from the tube portion of the pump assembly to the interior space of the inner shell.

18 Claims, 7 Drawing Sheets

(56) References Cited

U.S. PATENT DOCUMENTS

| | | |
|---|---|---|
| 870,719 A | 11/1907 | Freeman |
| 1,034,005 A | 7/1912 | Farnum |
| 1,034,346 A | 7/1912 | Cottrell et al. |
| 1,050,886 A * | 1/1913 | Wetherell ............... B60C 23/12 152/426 |
| 1,124,698 A | 1/1915 | Chamberlin |
| 1,134,361 A | 4/1915 | Wetherell |
| 1,153,026 A | 9/1915 | Campbell |
| 1,160,224 A | 11/1915 | Wagenhorst |
| 1,177,461 A | 3/1916 | Wagenhorst |
| 1,331,945 A | 2/1920 | Smith |
| 1,339,732 A | 5/1920 | Allen |
| 1,417,489 A | 5/1922 | Block |
| 1,671,980 A | 6/1928 | Derry |
| 1,720,396 A | 7/1929 | Goebel |
| 1,750,209 A | 3/1930 | Ackerman et al. |
| 1,838,448 A | 12/1931 | Pomfret |
| 1,853,162 A | 4/1932 | Jacobi |
| 1,893,718 A | 1/1933 | Stettner |
| 1,931,785 A | 10/1933 | Wright |
| 2,031,472 A | 2/1936 | Errig et al. |
| 2,085,213 A | 6/1937 | Fergueson |
| 2,229,251 A | 1/1941 | Meili |
| 2,273,949 A | 2/1942 | Galanot et al. |
| 2,339,551 A | 1/1944 | Stevens |
| 2,422,092 A | 6/1947 | Gregg |
| 2,437,108 A | 3/1948 | Madison |
| 2,513,673 A | 7/1950 | Prell |
| 2,559,119 A | 7/1951 | Frank |
| 2,572,612 A | 10/1951 | Goepfrich et al. |
| 2,667,365 A | 1/1954 | Hollifield |
| 2,722,260 A | 11/1955 | Renwick, Sr. |
| 2,886,138 A | 5/1959 | Bruner |
| 2,921,759 A | 1/1960 | Elkin et al. |
| 2,958,143 A | 11/1960 | Bonic |
| 2,964,245 A | 12/1960 | Anderson et al. |
| 2,976,033 A | 3/1961 | Martin |
| 3,027,559 A | 4/1962 | Moeller et al. |
| 3,035,447 A | 5/1962 | Carrigan |
| 3,095,918 A | 7/1963 | Mike |
| 3,120,255 A | 2/1964 | Pellegrino |
| 3,167,011 A | 1/1965 | Gartside et al. |
| 3,263,765 A | 8/1966 | Just et al. |
| 3,275,085 A | 9/1966 | Bunting et al. |
| 3,304,981 A | 2/1967 | Sheppard |
| 3,331,423 A | 7/1967 | Guin |
| 3,340,921 A | 9/1967 | Garfinkle |
| 3,364,558 A | 1/1968 | Freet |
| 3,387,352 A | 6/1968 | Walter |
| 3,388,820 A | 6/1968 | Lebre |
| 3,427,933 A | 2/1969 | Taylor-Myers |
| 3,451,564 A | 6/1969 | Haas |
| 3,487,527 A | 1/1970 | Melin |
| 3,526,741 A | 9/1970 | Glorioso |
| 3,553,816 A | 1/1971 | Arnshav |
| 3,597,572 A | 8/1971 | Ettinger et al. |
| 3,626,598 A | 12/1971 | Robertson |
| 3,665,992 A | 5/1972 | Rossel |
| 3,672,421 A | 6/1972 | Anderson |
| 3,712,358 A | 1/1973 | Einarsson |
| 3,766,956 A | 10/1973 | Ruane et al. |
| 3,773,389 A | 11/1973 | Foster et al. |
| 3,872,908 A | 3/1975 | Einarsson |
| 3,926,239 A | 12/1975 | Petersons et al. |
| 3,942,572 A * | 3/1976 | Crandall ............. B60C 11/1612 152/208 |
| 4,119,132 A | 10/1978 | Ries |
| 4,120,336 A | 10/1978 | Baskall |
| 4,171,718 A | 10/1979 | Walrave et al. |
| 4,261,622 A | 4/1981 | Miller |
| 4,287,926 A | 9/1981 | Wong |
| 4,432,405 A | 2/1984 | Grushkin |
| 4,529,024 A | 7/1985 | Vijay |
| 4,598,749 A | 7/1986 | Mandekic |
| 4,676,289 A | 6/1987 | Yi Su |
| 4,838,329 A | 6/1989 | Ohuchi et al. |
| 4,842,086 A | 6/1989 | Michna |
| 4,844,137 A | 7/1989 | Einarsson |
| 4,883,104 A | 11/1989 | Minami |
| 4,922,984 A | 5/1990 | Dosjoub et al. |
| 4,966,080 A | 10/1990 | Teissier et al. |
| 5,115,747 A | 5/1992 | Teissier et al. |
| 5,198,048 A | 3/1993 | Hojo |
| 5,198,049 A | 3/1993 | Hojo |
| 5,221,379 A | 6/1993 | Nicholas |
| 5,411,070 A * | 5/1995 | Yadegar ............... B60C 11/1612 152/210 |
| 5,609,700 A | 3/1997 | West |
| 5,642,921 A | 7/1997 | Webb et al. |
| 5,707,463 A | 1/1998 | Hansen |
| 5,788,335 A | 8/1998 | O'Brien |
| 5,810,451 A * | 9/1998 | O'Brien ................... B60B 3/02 152/210 |
| 6,022,082 A | 2/2000 | O'Brien |
| 6,044,883 A | 4/2000 | Noyes |
| 6,092,576 A * | 7/2000 | Hatta ..................... B60C 11/00 152/208 |
| 6,244,666 B1 | 6/2001 | O'Brien |
| 6,386,252 B1 | 5/2002 | O'Brien |
| 6,668,685 B2 | 12/2003 | Boston |
| 6,905,564 B1 * | 6/2005 | O'Brien ................. B29D 30/66 152/210 |
| 7,093,369 B2 | 8/2006 | Ohnesorge |
| 7,117,731 B2 | 10/2006 | Hrabal |
| 7,987,889 B1 | 8/2011 | Story |
| 8,042,586 B2 | 10/2011 | Losey et al. |
| 8,075,294 B2 | 12/2011 | Cuny et al. |
| 8,082,961 B2 | 12/2011 | Collette et al. |
| 8,113,254 B2 | 2/2012 | Benedict |
| 8,186,984 B2 | 5/2012 | Cuny et al. |
| 8,186,985 B2 | 5/2012 | Cuny et al. |
| 8,196,637 B1 | 6/2012 | Story |
| 8,215,367 B1 | 7/2012 | Story |
| 8,225,838 B1 | 7/2012 | Story |
| 8,235,081 B2 | 8/2012 | Delgado et al. |
| 8,267,679 B2 | 9/2012 | Cuny et al. |
| 8,322,036 B2 | 12/2012 | Delgado et al. |
| 8,381,784 B2 | 2/2013 | Delgado |
| 8,381,785 B2 | 2/2013 | Losey |
| 8,550,137 B2 | 10/2013 | Delgado et al. |
| 8,573,270 B2 | 11/2013 | Hinque |
| 8,695,661 B2 | 4/2014 | Delgado et al. |
| 8,746,306 B2 | 6/2014 | Hinque et al. |
| 8,857,484 B2 | 10/2014 | Hinque |
| 8,944,126 B2 | 2/2015 | Frantzen |
| 9,278,584 B2 | 3/2016 | Bushnell et al. |
| 9,290,057 B2 | 3/2016 | Bushnell et al. |
| 2005/0044891 A1 * | 3/2005 | Hartgrove ............ A44C 17/0208 63/29.1 |
| 2005/0092411 A1 | 5/2005 | O'Brien |
| 2005/0206098 A1 | 9/2005 | Ohnesorge |
| 2006/0191615 A1 | 8/2006 | O'Brien et al. |
| 2007/0079915 A1 | 4/2007 | Jones |
| 2007/0144646 A1 | 6/2007 | Mancia et al. |
| 2008/0047645 A1 | 2/2008 | Gerhardt et al. |
| 2008/0066348 A1 | 3/2008 | O'Brien et al. |
| 2009/0044891 A1 * | 2/2009 | Lee ..................... B60C 11/00 152/416 |
| 2009/0165912 A1 | 7/2009 | Collette et al. |
| 2010/0159047 A1 | 6/2010 | Cuny et al. |
| 2010/0276045 A1 | 11/2010 | Cuny et al. |
| 2011/0042875 A1 | 2/2011 | Story |
| 2011/0151038 A1 | 6/2011 | Cuny et al. |
| 2011/0151039 A1 | 6/2011 | Cuny et al. |
| 2011/0151040 A1 | 6/2011 | Cuny et al. |

FOREIGN PATENT DOCUMENTS

| | | |
|---|---|---|
| JP | 61-207202 | 9/1986 |
| JP | 63-184508 | 7/1988 |

(56) References Cited

FOREIGN PATENT DOCUMENTS

JP         03-295710     12/1991
JP         10-175407      6/1998

\* cited by examiner

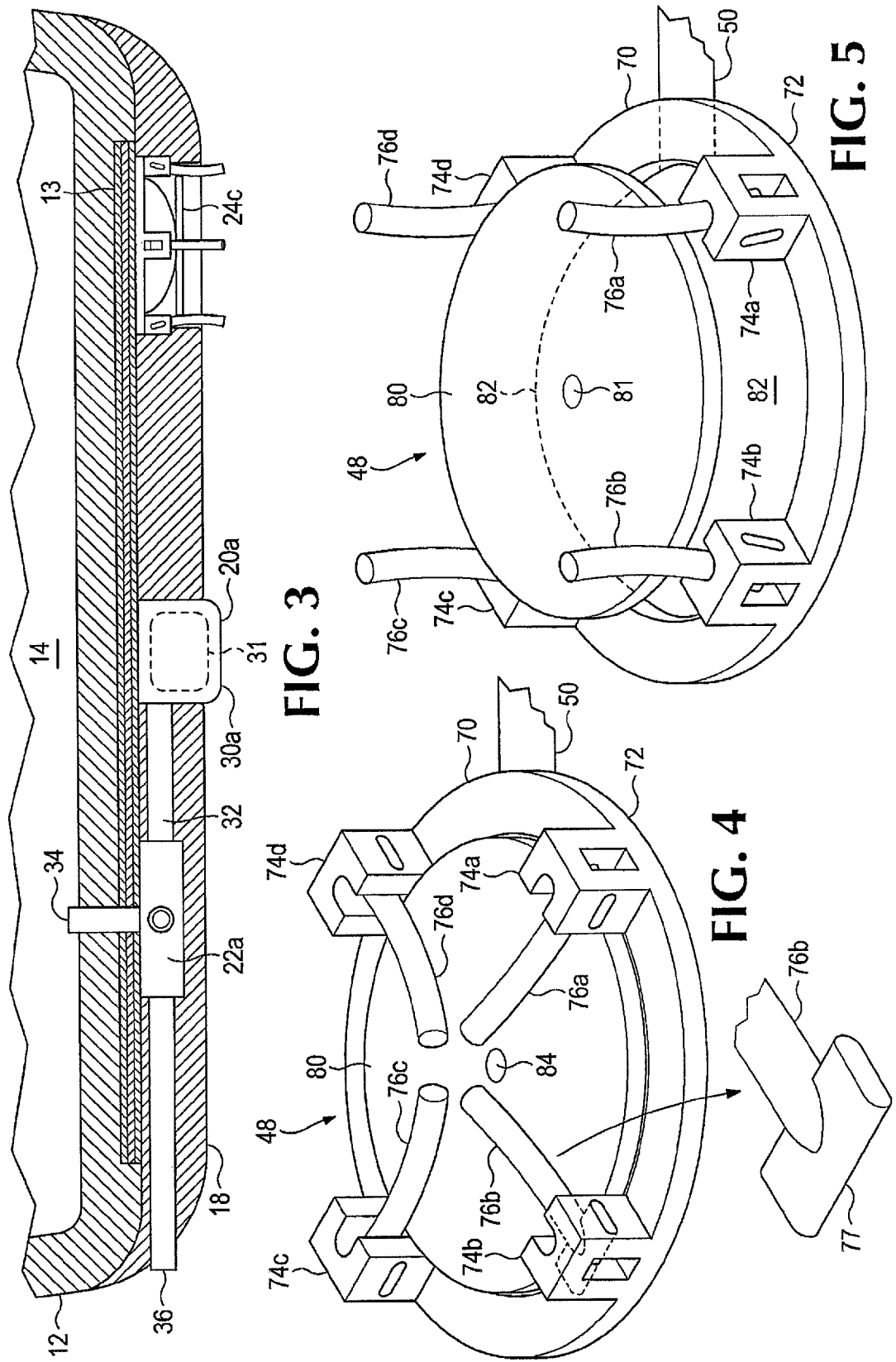

ALL-WEATHER TIRE

CROSS REFERENCE TO RELATED APPLICATION

This application is a continuation of U.S. patent application Ser. No. 13/971,598, entitled ALL-WEATHER TIRE, filed Aug. 20, 2013, which application is a continuation-in-part of U.S. patent application Ser. No. 13/663,918, entitled ALL SEASON SAFETY TIRE, filed Oct. 30, 2012, which application claims the benefit of U.S. Provisional Application Ser. No. 61/628,386, entitled ALL SEASON SAFETY TIRE, filed Oct. 31, 2011. These applications are incorporated by reference herein in their entireties.

BACKGROUND OF THE INVENTION

Typically, automobile operators who live in snow zones must cope with the possibility that at times roads may be snow or ice covered. This frequently necessitates changing the tires to snow or studded tires to provide greater traction during such events. Additionally, the snow or ice condition may be short-lived or be a function of altitude requiring removal of enhanced traction tires when the condition is no longer present. Changing tires is time consuming and frequently must be done while pulled over on the side of the road in poor weather conditions or done by a garage which can be time consuming and costly. While studded tires may be permanently used in some states during a designated snow season, these tires tear up roadways thus leading to high maintenance costs.

BRIEF SUMMARY OF THE INVENTION

An all-weather tire includes features that enhance safety and usability in a variety of driving conditions as well as some manufacturing processes that may be used during the production and provides an all-weather tire having selectively deployable and retractable studs for greater traction when needed.

An all-weather tire includes a toroidal shell enclosing an air-filled chamber and a plurality of stud actuation chambers contained within the shell for selectively deploying studs to extend past the tire's outer radial surface for engaging a roadway or surface. The studs may be retracted when no longer needed. A mechanical pump assembly or plurality of such assemblies powered by compression of the tire engaging the roadway may be used as a power source for generating pneumatic pressure and an internal valve assembly or assemblies may be used to route the pneumatic pressure appropriately. The pump and valve assemblies may be controlled either mechanically or electrically.

This provides a self-actuating stud deployment feature for the tire that obviates the need to change from smooth surface tires to studded tires in order to have all-weather traction in snow or ice.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3 is a cutaway view taken along line 3-3 of FIG. 1.

FIG. 4 is a perspective view of a stud actuation chamber with the studs in a retracted position.

FIG. 5 is a perspective view of the stud actuation chamber of FIG. 4 showing the studs in a deployed position.

DETAILED DESCRIPTION

Figure 1:
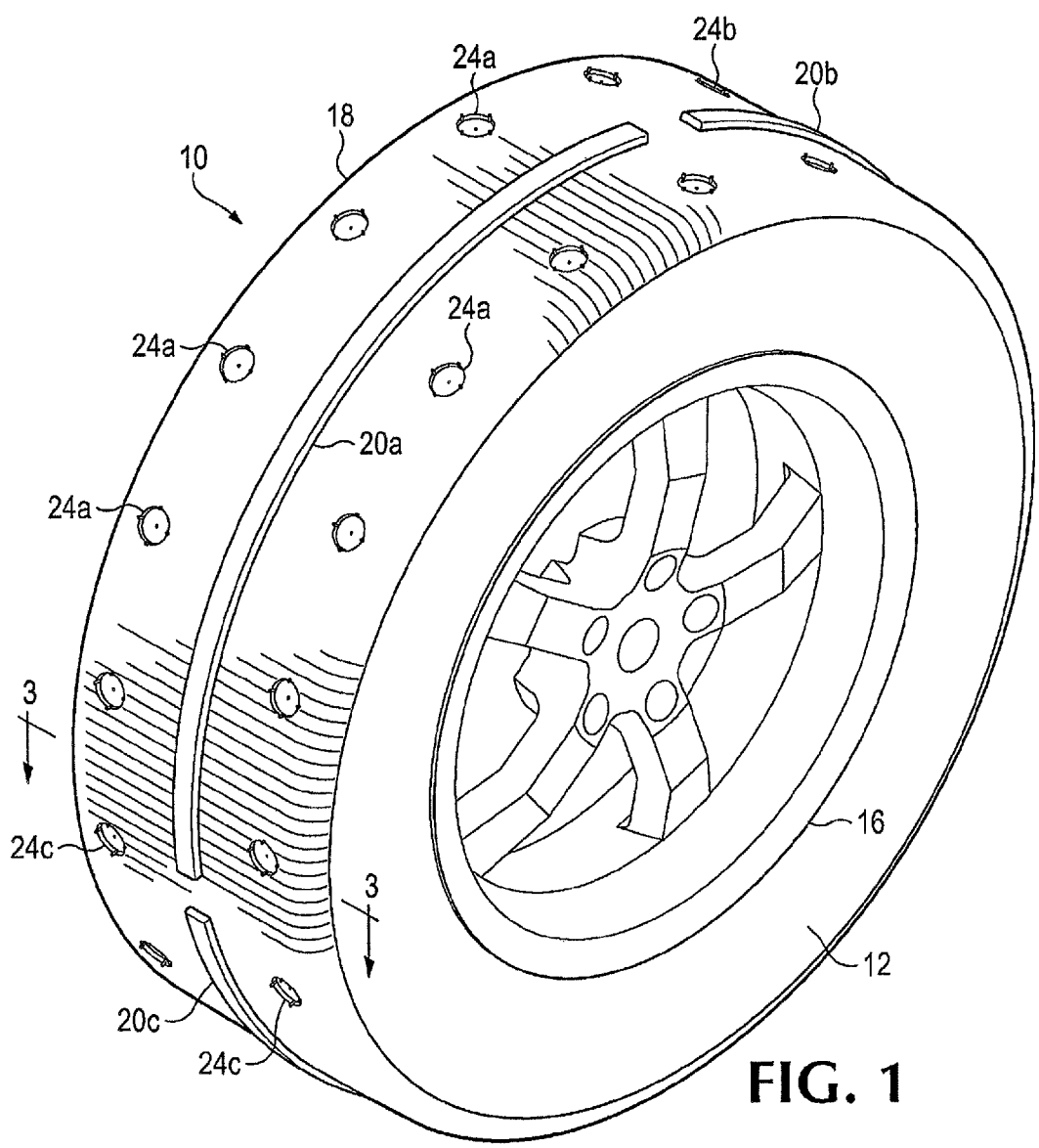
FIG. 1 is a perspective view of a tire employing an extendable and retractable stud system.

An all-weather tire includes a conventional belted radial tire having a deployable stud feature. The studs are components of stud lift actuators, which are embedded in the outer shell of the tire. In a preferred embodiment, the studs are selectively deployed and retracted by a pneumatic system that may be operated from within the inside of a vehicle. An electrical system may be used to selectively power pneumatic valves that open and close, directing air or other pneumatic fluid into the stud lift actuators for deployment or retraction.

The studs are housed in stud actuator assemblies, which are lift chambers connected by valves to a source of air under pressure. In one embodiment, this source may be the hollow interior of the tire itself. It takes little pressure to deploy the studs, so any drop in interior tire pressure is negligible. The actuator assemblies are preferably arranged in groups of 8 or 10 or 12, each group having a dedicated pneumatic valve assembly.

In addition, the preferred system may be configured to re-inflate the tire when the studs are retracted. This is a self-actuating feature made possible by a pump that is powered by the action of the tire rolling over a road or other surface as the vehicle is driven.

The pump may be configured as an elongate radial tube having a bladder. This bladder may be embedded in the outer shell of the tire, extending circumferentially around the periphery of the tire and extending slightly radially outwardly of the tire's tread when inflated. The bladder has an inlet coupled to ambient air through a selectively operable valve and an outlet coupled to the hollow interior of the tire. When the tire rolls along a roadway or other surface, it compresses the bladder at a pinch point forcing air into the tire's interior through a one-way check valve. Thus, the roadway acts as a pinch roller, depressing the bladder, thereby forcing air out of the forward end outlet ahead of the pinch point. At the same time, the flattened bladder to the rear of the pinch point has natural resiliency, and as it springs back into shape, a vacuum is created which sucks outside air into the bladder through a one-way inlet check valve. The pump may consist of multiple pump assemblies spaced about the outside radial surface of the tire. There may be a plurality such as three or five such assemblies or there could be only one.

The stud lift actuator mechanisms comprise chambers, which include a cylindrically-shaped bracket made at least in part, of a resilient material, a bladder and a lift table recessed into the outer surface of the tire. The stud lift actuators are coupled to a source of fluid under compression through conduits embedded in the tire or routed along the inside interior surface of the tire's outer shell. The fluid could be the air pressure in the interior of the tire itself. The conduits are connected to a valve assembly, which selectively serves to inflate or deflate bladders that deploy or retract the studs.

The stud lift actuator mechanisms comprise chambers, which include a cylindrically-shaped bracket made at least in part, of a resilient material, a bladder and a lift table recessed into the outer surface of the tire. The stud lift actuators are coupled to a source of fluid under compression through conduits embedded in the tire or routed along the inside interior surface of the tire's outer shell. The fluid could be the air pressure in the interior of the tire itself. The conduits are connected to a valve assembly, which selectively serves to inflate or deflate bladders that deploy or retract the studs.

In a preferred embodiment, each bracket in an actuator assembly has four studs which are pins rotatably mounted on the bracket to rotate from a flat retracted position to an upright position. In the center of the bracket, there is a bladder with a disk attached at the top that functions as a lift table. In a retracted state, the pins are folded to lie across the disk. A valve assembly selectively couples the interior of the tire to the bladders when deployment is desired. As the bladder inflates, it forces the lift table up, thereby forcing the pins to rotate in the brackets until they are upright. The table rises until it is flush with the tire's outer surface. At this point when the lift table has reached its stroke limit, the pins extend past the outer radial surface of the tire in their fully deployed state, thus engaging the road surface that may be snow or ice-covered. The pins thus provide traction for the tire.

Since the stud lift chambers are embedded in the tire but are recessed into the surface, the studs also serve to indicate wear conditions. As the tire tread wears away, the studs eventually begin to contact the road surface making a clicking noise that alerts the operator that the tire tread is thin and that the tire needs replacing.

Referring now to the drawings, a tire 10 includes a toroidal shell 12 enclosing a hollow interior air space 14 (refer to FIG. 3). The tire 10 is mounted on a wheel 16, the rim of which seals the air space 14. The tire shell 12 can be a radial tire constructed of a plurality of radial belts 13 (see FIG. 11) covered by an outer layer of rubber 18 which may include a tread designed to grip the road surface and prevent sliding. Embedded in the outer shell are pluralities of pump assemblies 20a, 20b valve assemblies 22a, 22b and stud actuation chambers 24a, 24b, and 24c all connected by pneumatic lines such as lines 26a, 26c. Not all pneumatic lines, pump assemblies, and stud actuation chambers are shown, it being understood that these are distributed about the radial surface of the tire. These components may be encased on the outer rubber layer 18 or they may be placed between radial plies or layers 13. Still another option is to affix the valve assemblies to the interior surface of the shell with the pneumatic lines coupled to the stud actuators through the outer shell.

Figure 2:
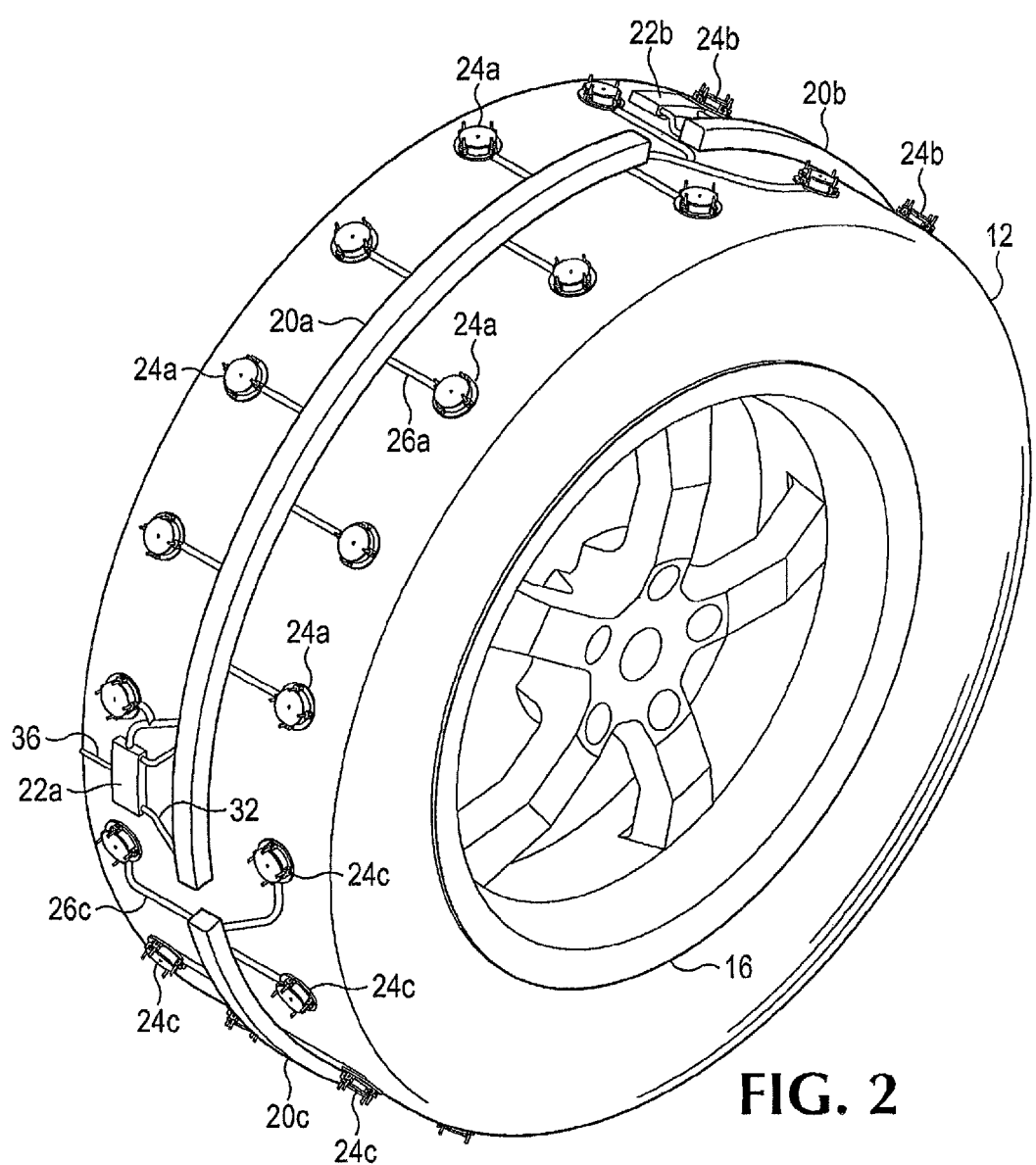
FIG. 2 is a perspective view of the tire of FIG. 1 with the outer tread layer removed.

With particular reference to FIGS. 2 and 3, a typical pump assembly 20a is embedded in the tread. There may be a plurality of such pump assemblies distributed about the outer periphery of the tire. As shown best in FIG. 2, each pump assembly like pump assembly 20a has its own valve assembly 22a and is coupled to a plurality of stud actuation chambers like chambers 24a via pneumatic lines 26a.

The pump assembly 20a comprises an elongate tube 30a that extends circumferentially along the outer surface of the tire. The tube 30a is inflated so that in its active state it bulges outwardly radially a short height above the tread surface 18 of the tire. The tube 30a is essentially a bladder that inflates. The bladder may be the tube itself or it may be an internal bladder 31 (shown in dashed outline) encased in a shell forming the tube 30a for added protection. The tube 30a is coupled to the valve assembly 22a by conduits 32 embedded in the outer shell. A second set of conduits 34 couple the valve assembly 22a to the interior air space 14 of the tire 10 and a conduit 36 vents to ambient atmosphere. The valve assembly 22a is coupled to a plurality of stud actuation chambers 24a by a pneumatic line 26a as shown best in FIG. 3. Another pump assembly such as pump assembly 20b has a valve assembly 22b and is coupled to stud actuation chambers 24b. Similarly a third group comprises stud actuation chambers 24c coupled to their own dedicated pump and valve assembly (not shown in FIG. 3). There can thus be groups of pump, valve assemblies, and stud actuation chambers distributed about the circumference of the tire. The exact number may depend upon various factors such as the size of the tire and the size of the pump assembly, e.g., the chosen length of the tube such as tube 30a. However, preferably there are an odd number of groups such as three or five. This keeps the tire balanced.

Figure 6:
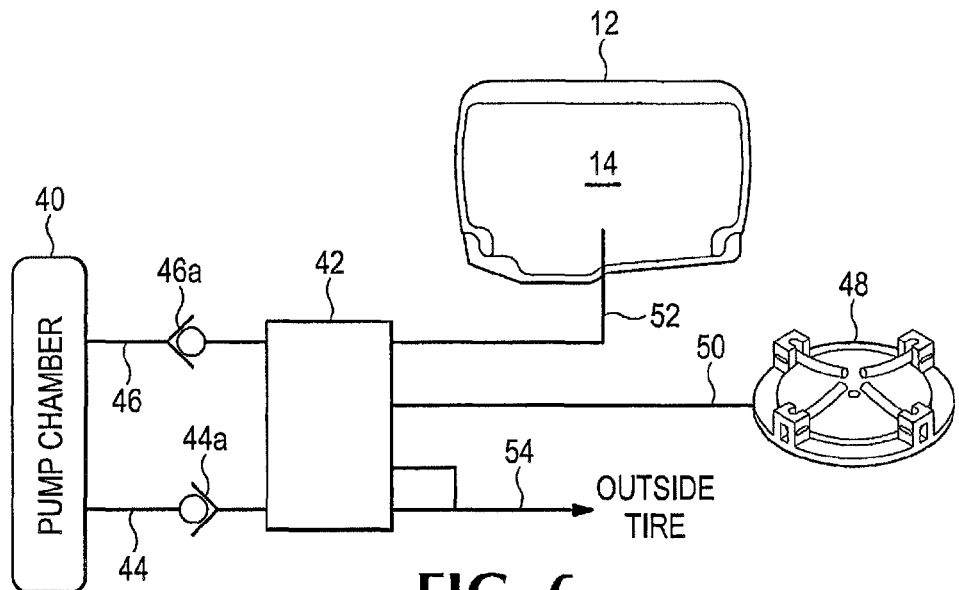
FIG. 6 is a block schematic diagram of a pneumatic circuit for a group of stud actuation chambers.

The hydraulic circuit of a typical pump, valve and stud actuator group is shown in FIG. 6. In this figure, a pump assembly 40 is coupled to a valve assembly 42 via two lines, an inlet line 44 and an outlet line 46. Inlet line 44 has a one-way check valve 44a and outlet line 46 has a one-way check valve 46a. The valve assembly 42 is connected to a stud actuation chamber 48 via line 50. It is to be understood that stud actuation chamber 48 schematically represents an entire plurality of such chambers as shown in FIGS. 1 and 2. Lines 52 and 54 couple from the valve assembly 42 to the interior air space 14 and to ambient atmosphere, respectively. Line 54 has two connections to different parts of the valve assembly 42 as will be explained below.

Figure 8:
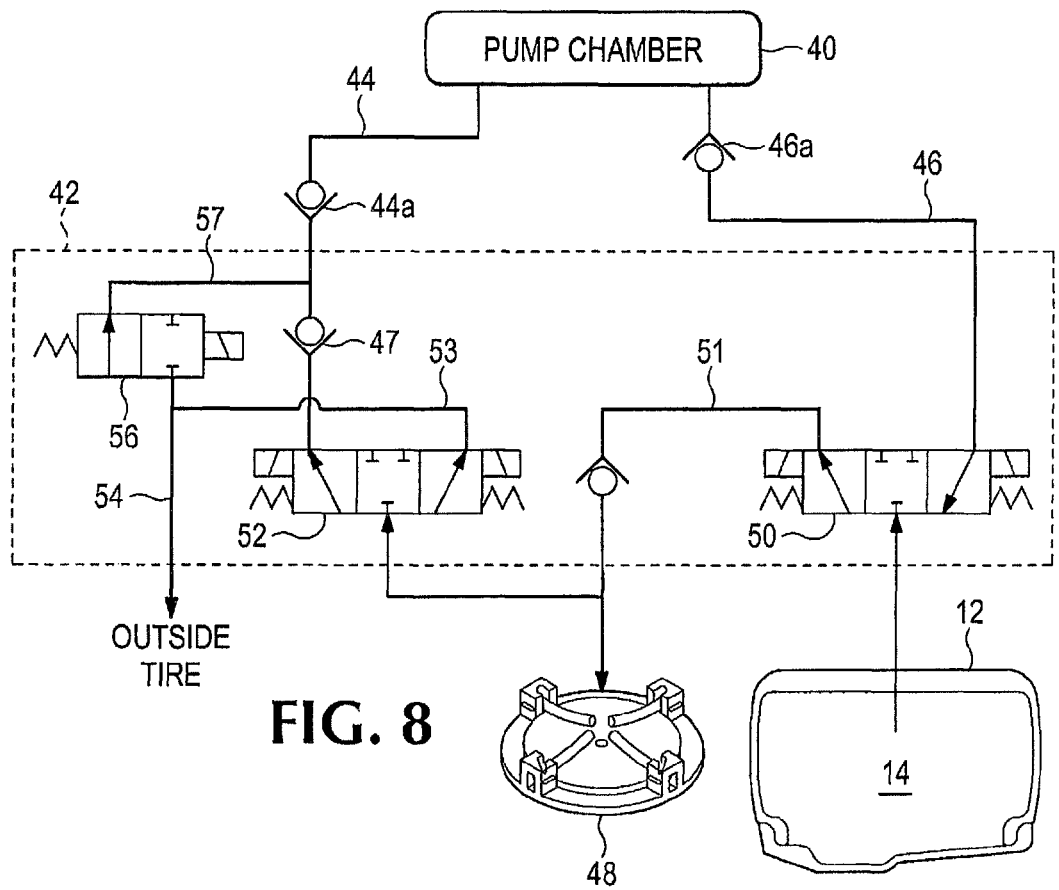
FIG. 8 is a detailed schematic diagram of a hydraulic circuit showing the operation of the valve mechanism of FIG. 6.

The valve assembly 42 is shown in detail in FIG. 8. A first two-way, three-position valve 50 connects the interior air space 14 either to the pump chamber outlet line 46 or to the stud actuation chambers 48 via line 51. A second two-way, three-position valve 52 connects the stud actuation chambers 48 to ambient atmosphere (outside tire) via line 53 or to the inlet line 44 through a pair of one-way check valves 44a, 47. A one-way 2-position valve 56 couples the inlet line 44 to the pump chamber 40 to ambient atmosphere by lines 54 and 57.

Figure 9:
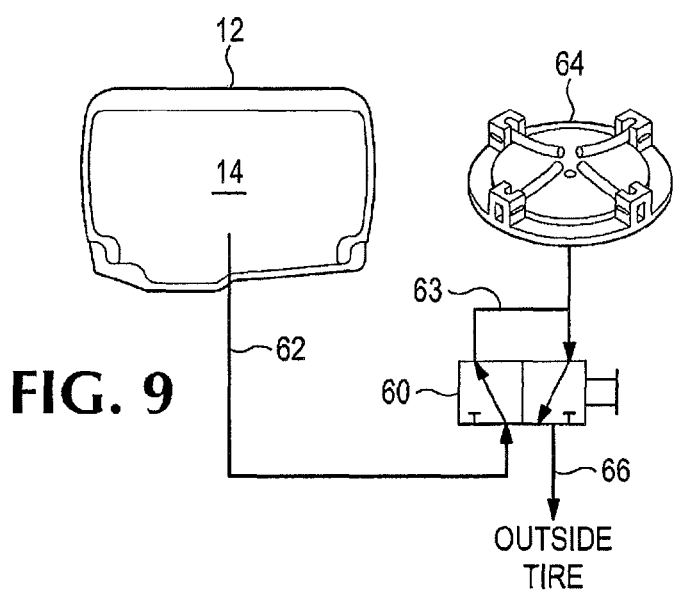
FIG. 9 is an alternative simplified hydraulic circuit that may be employed in lieu of the circuit of FIG. 8.

An alternative arrangement is shown in FIG. 9. In this configuration, the interior air space of the tire 14 is coupled through a two-position valve 60 via pneumatic lines 62 and 63 to a plurality stud actuation chambers 64. The stud actuation chambers 64 may be vented to ambient atmosphere through the valve 60 via line 66. The tire pressure itself is utilized to force deployment of studs when the valve 60 opens. When the studs are retracted, it may be necessary to re-inflate the tire to recommended pressure.

Referring now to FIGS. 4 and 5, a typical stud actuation chamber 70 comprises a circular base 72 having four brackets 74a-74d. The base is placed on top of the belts 13 in cylindrical voids in the outer rubber layer 18. The brackets 74a-74d may be constructed of a resilient material. Contained within the brackets 74a-74d are studs 76a-76d, which may be metallic in composition. These studs will engage a road or other surface when they are deployed as will be described below. The studs 76a-76d are rotatably mounted in the brackets on flat pins such as pin 77 which extend through apertures in the brackets. Because the brackets are made of resilient material such as a stiff rubber, the flat pins can be made to rotate in the apertures which will deform to accommodate the shape of the pins such as pin 77 and then apply a restoring force when the bladder 82 deflates and the pins 76a-76d are allowed to pivot in the brackets and thereby retract.

The studs 76a-76d are forced to deploy by the action of a lift table 80, which may be forced to rise by the inflation of a bladder 82. The lift table 80 rests on top of the bladder 82 and may be attached to it by a grommet 81 or adhesive or any other attachment mechanism. The bladder 82 is pneumatically actuated through a pneumatic line such as line 50 in FIG. 6. When the line is pressurized, the bladder 82 inflates causing the lift table 80 to rise. As the lift table 80 rises it forces the studs 76a-76d to rotate in the brackets 74a-74d so that they stick straight up and thereby extend radially outwardly of the tire surface 18. When the bladder 82 deflates, the studs resume their initial state under the restoring force of the resilient brackets 74a-74d applying torsion on the flat pins such as pin 77.

Figure 7:
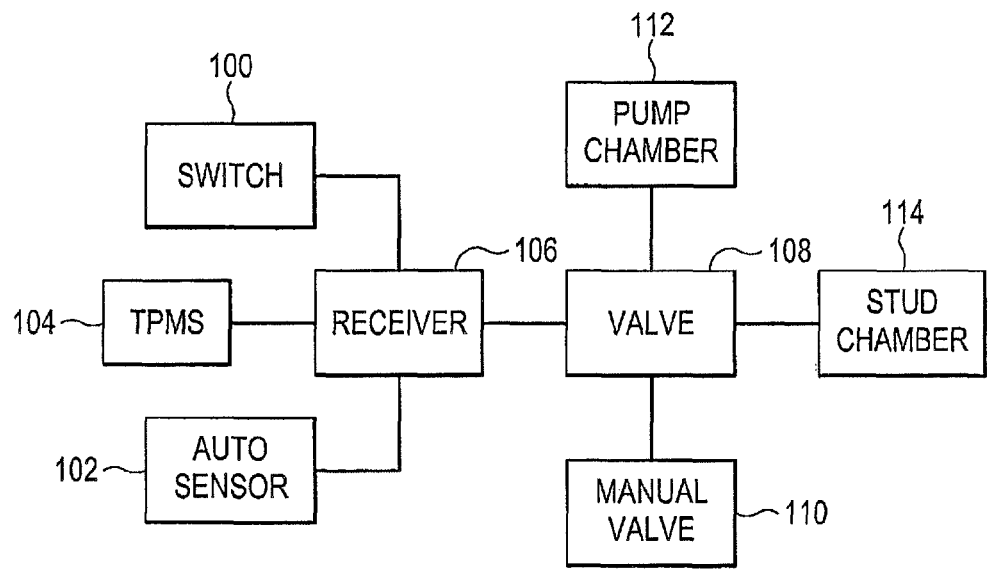
FIG. 7 is a block schematic diagram of a system in an automobile for selectively deploying retractable tire studs.

The system may be operated in a number of ways and one such configuration is shown in FIG. 7. A manual switch 100, a TPMS (tire pressure monitoring system) 104 and an auto sensor 102 are all coupled to a receiver 106. The receiver 106 is an electronic device that receives signals from the sensors or switches and provides output signals to actuate a valve assembly 108. The valve assembly 108 may be one that is operated by solenoids or other electronic means (not shown) such as various types of electronic actuators. Power can come from the auto's internal battery or from a generator contained within the wheel assembly. A manual valve assembly 110 may also be provided in addition to the valve assembly 108 for certain selected functions. This valve could be located on the tire itself and could be used as an alternative means of controlling deployment/retraction of the studs for each tire. In such a case, the valve assembly 108 would not be needed since valve assembly 110 could be used to connect the interior of the tire to the stud actuation chambers, as in the embodiment of FIG. 9. Alternatively, it could be hard-wired within the car. The valve arrangement of FIG. 9 would be especially well suited for this configuration. As shown in FIGS. 6, 8 and 9 the valve assembly 108, which schematically may represent a plurality of such valve assemblies, selectively inflates and vents to the pump chambers 112 and the stud chambers 114. Many automobiles have auto sensors such as sensor 102. These devices automatically monitor conditions such as temperature and humidity to indicate the presence of ice. In some instances, the condition is annunciated to the driver audibly but the annunciation signal could also be used to provide a stud deployment command to the receiver 106 and thence to the valve assembly 108. The receiver 106 is an electronic module that receives commands or sensor data and produces an output signal of sufficient voltage to run pumps or actuators as necessary.

In operation, a stud deployment command causes the internal pressure of the tire itself to inflate the bladders 82 in the stud actuation chambers 48 (refer to FIGS. 6 and 8). Only a few psi are required to deploy the studs and the tire can be re-inflated by use of the pump assemblies after the studs are retracted. When the studs are to be deployed, the valve 50 is left shifted to connect the interior air space 14 to each group of stud actuation chambers 48. Valve 52 remains closed. When the studs are to be retracted, valve 52 is right shifted venting the stud actuation chambers to ambient and valve 50 is right shifted allowing the pump chamber 40 to re-inflate the interior airspace 14. At the same time, valve 56 is right shifted to allow the pump chamber to re-inflate from outside ambient. This will happen because as the tire rotates it squeezes air out of the tube 30 forward of the road/tire contact area or "pinch point". Behind the pinch point a vacuum is created which will draw air back in. Additionally or as an alternative, the valve 52 may be left shifted so that air is drawn out of the stud actuation chamber bladders by the vacuum behind the pinch point. This collapses the bladders and allows the studs to retract.

Other means may be employed to power the stud actuation chambers and these may include pumps carried in the interior of the tire which could be battery powered and activated by a wireless signal. The preferred system uses the air pressure within the tire itself which can then be replenished when the studs are retracted. This obviates the need to re-inflate the tire via a mechanical garage pump. A very simple way of accomplishing this function is shown in FIG. 9. The manual valve 60 is shown in the deployment mode, connecting the interior air space 14 with stud actuation chambers 64 thereby inflating their bladders and causing the lift tables to rise as described above. A right shift decouples the stud actuation chambers from the interior air space and allows the stud actuation chambers to vent to outside ambient.

Figure 10:
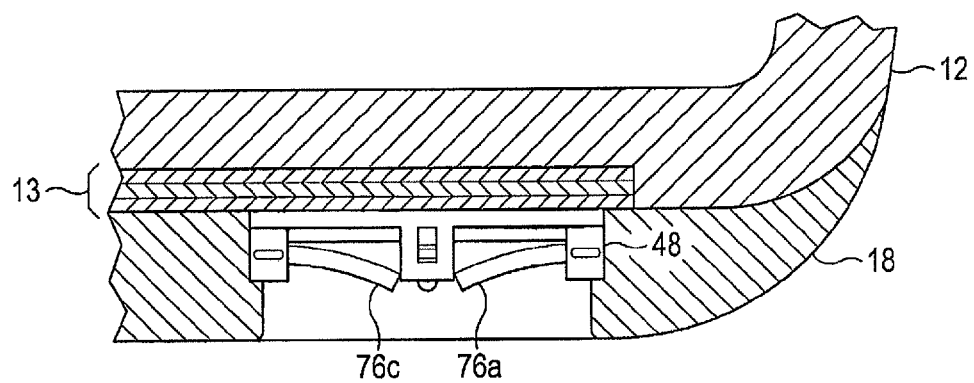
FIG. 10 is a partial cutaway view of the tire of FIG. 3 showing the tire with a full tread.
Figure 11:
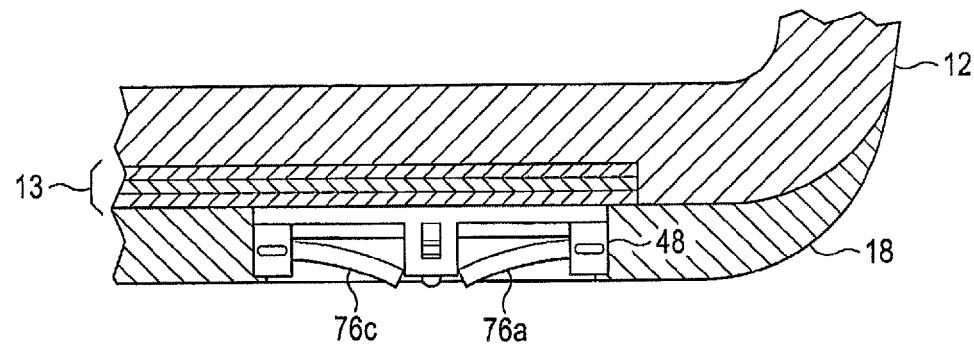
FIG. 11 is a partial cutaway view of the tire of FIG. 3 showing the tire with a reduced or worn tread.
Figure 12:
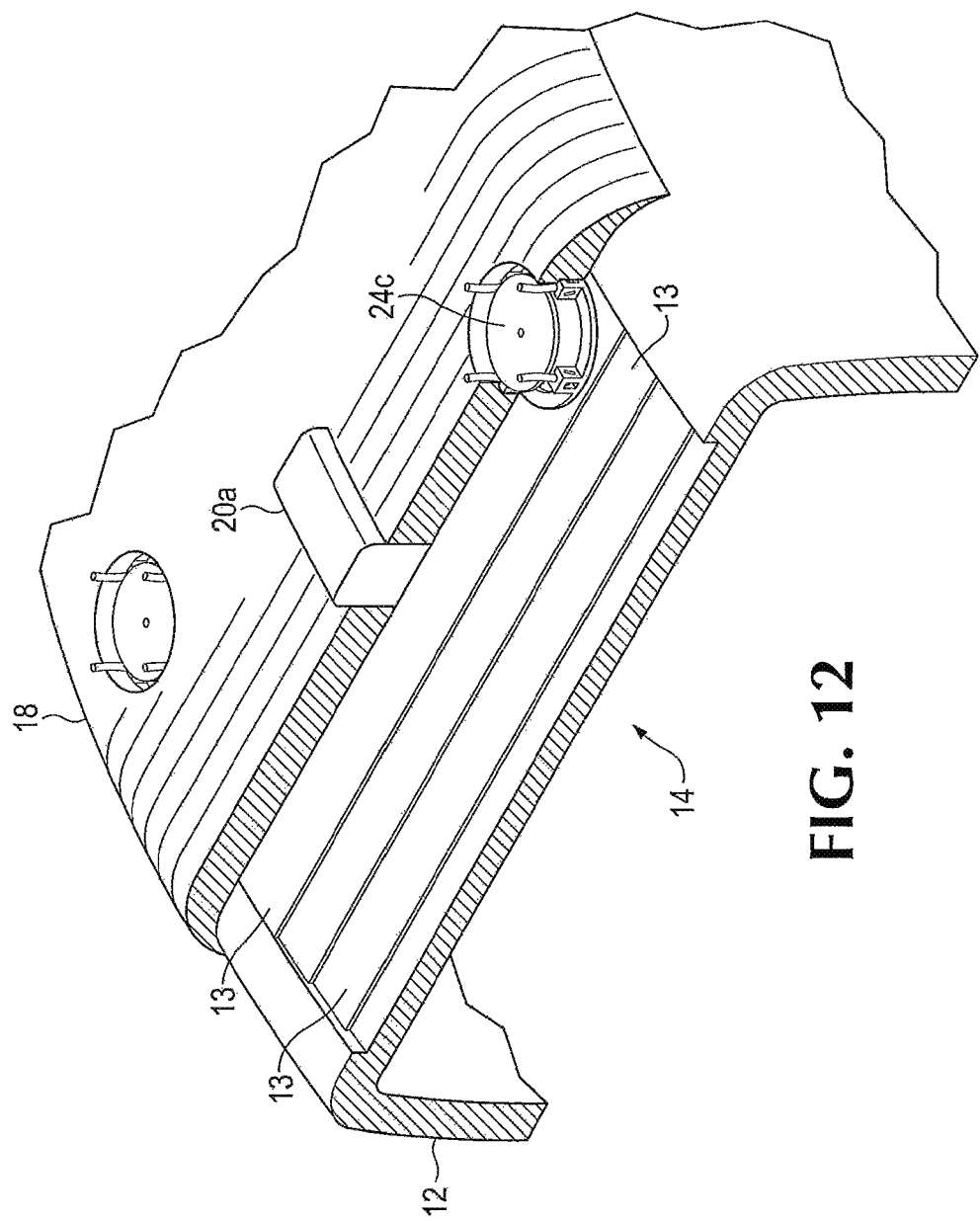
FIG. 12 is a partial perspective view of the tire of FIG. 1 with the outer tread layer partially removed to expose the radial belts underneath

Another feature of an all-weather tire is shown in FIGS. 10 and 11. FIG. 10 shows a tire with most of its tread on the outer rubber layer 18 remaining. The stud actuation chamber 48 is recessed into the layer 18 and so the studs do not contact the road. However as the tread wears down it reaches a point as shown in FIG. 11 in which the studs 76c and 76a, which are slightly curved, stick out past the outer layer 18. When this happens, the driver will hear a clicking sound indicating that the tread is worn and a new tire is needed. This is an audible safety feature that is inherent in the all-weather tire design of FIGS. 1-9. In addition, the studs will not damage the roadway because they are resiliently mounted and will compress into the tread.

While an all-weather tire has been described that makes use of a specific pump and valve arrangement for deploying and retracting studs, other methods, and apparatus may be employed. While a plurality of pump assemblies, valve assemblies, and stud actuation chambers may be preferred, it is possible that only one such pump assembly and valve assembly may be used to power all the stud actuation chambers. In another example, instead of using the interior pressure of the tire to deploy the studs, a dedicated pump assembly may be used. The pump assembly may be electrically powered and could be contained within the tire or positioned on a wheel rim. Actuation by wireless such as BLUETOOTH could be used to turn on the pump and both inflate and deflate the stud actuation chambers. Additionally, the stud actuation chambers could take different forms besides the cylindrical wells having a bladder and lift table as shown in the drawings. Such studs could comprise telescoping rods coupled to a pneumatic line or lines and could be deployed by linear actuators that respond to pneumatic pressure. Another possibility is that the studs, instead of rotating to deploy, could be carried on the lift table as straight linearly acting rods or pins held in guides. Another alternative is that the pump assembly could be used to actuate the studs directly instead of tapping into the interior pressure of the tire to do so or the pump assembly could inflate a pressurized canister that would store pressure for later deployment.

The terms and expressions that have been employed in the foregoing specification are used therein as terms of description and not of limitation, and there is no intention in the use of such terms and expressions of excluding equivalents of the features shown and described or portions Thereof, it being recognized that the scope of the invention is defined and limited only by the claims which follow.

We claim:

1. A tire, comprising:
   an inner shell having a hollow interior space;
   an outer shell disposed radially outward from the inner shell;
   at least one pump assembly disposed adjacent to the inner shell and having a compressible tube portion; and
   at least one valve assembly coupled to the at least one pump assembly and to the interior space of the inner shell, wherein the at least one valve assembly is disposed radially between the inner shell and the outer shell,
   wherein the tube portion of the at least one pump assembly is configured to expand radially outwardly beyond the outer shell and to compress radially inwardly, and
   wherein the at least one valve assembly is configured to selectively direct a fluid from the tube portion of the at least one pump assembly to the interior space of the inner shell and configured to selectively direct the fluid from the interior space of the inner shell to the tube portion of the at least one pump assembly.

2. The tire of claim 1, wherein the at least one pump assembly is disposed radially between the inner shell and the outer shell.

3. The tire of claim 1, wherein the tube portion of the at least one pump assembly comprises an internal bladder encased in a protective outer shell.

4. The tire of claim 3, wherein the at least one pump assembly is powered by compression of the internal bladder as the tube portion engages a road surface.

5. The tire of claim 1, wherein the at least one valve assembly comprises a first conduit coupled to the tube portion of the at least one pump assembly for selectively directing the fluid to and from the at least one valve assembly and the tube portion and a second conduit coupled to the interior space of the inner shell for selectively directing the fluid to and from the at least one valve assembly and the interior space of the inner shell.

6. The tire of claim 5, wherein the at least one valve assembly further comprises a third conduit coupled to outside of the tire and is further configured to selectively direct the fluid outside of the tire.

7. The tire of claim 6, wherein the tire is a component of a self-inflating tire system further comprising a receiver and a tire pressure monitoring system, the tire pressure monitoring system is configured to monitor a pressure of the fluid disposed in the interior space of the tire, and the receiver is configured to receive signals from the tire pressure monitoring system and to actuate the at least one valve assembly.

8. The tire of claim 1, further including a plurality of retractable rotatable stud members mounted within the outer shell, each mounted to rotate from a retracted position in which the stud member does not protrude past the outer shell to a deployed position in which the stud member protrudes radially outwardly of the outer shell, the at least one pump assembly being in fluid communication with the stud members to pneumatically retract and deploy the stud members.

9. The tire of claim 8, further comprising plural valve assemblies disposed circumferentially around the inner shell and spaced apart relative to each other, wherein each of the valve assemblies is coupled to a respective pump assembly and is configured to selectively direct the fluid between the pump assembly and the interior space of the inner shell.

10. The tire of claim 1, wherein the tube portion includes a pinch point such that when the at least one valve assembly is actuated, the tire's engagement with a road surface compresses the tube portion and forces fluid out of a forward outlet of the tube portion ahead of the pinch point and causes a compressed portion of the tube portion rearward of the pinch point to expand and create a vacuum that draws fluid into the tube portion through the at least one valve assembly.

11. A tire, comprising:
    an inner shell having a hollow interior space;
    an outer shell disposed radially outward from the inner shell;
    at least three pump assemblies disposed circumferentially around the inner shell and spaced apart relative to each other, wherein each pump assembly has a tube portion and is selectively actuatable between an expanded state in which the tube portion extends radially outward beyond the outer shell and a compressed state in which the tube portion does not extend radially outward beyond the outer shell; and
    at least three valve assemblies disposed circumferentially around the inner shell and spaced apart relative to each other, wherein each valve assembly is coupled to a respective pump assembly by an inlet line and an outlet line and to the interior space of the inner shell, and wherein the at least three valve assemblies are configured to selectively direct fluid from the tube portions of the at least three pump assemblies to the interior space of the inner shell and from the interior space of the inner shell to the tube portions of the at least three pump assemblies and to selectively actuate the at least three pump assemblies between the expanded state and the compressed state, wherein the inlet line includes a first one-way check valve configured to direct the fluid from the tube portion of the respective pump assembly to the valve assembly, and wherein the outlet line includes a second one-way check valve configured to direct the fluid from the valve assembly to the tube portion of the respective pump assembly.

12. The tire of claim 11, further including a plurality of stud actuation chambers each mounting at least one rotatable stud member for rotation from a retracted position encased in the outer shell to a deployed position protruding radially outwardly of the outer shell, the stud actuation chambers being selectively pneumatically actuated by the at least three pump assemblies to retract and deploy the stud members.

13. The tire of claim 11, wherein each valve assembly includes a first valve mechanism connecting the interior space of the inner shell and the outlet line and a second valve mechanism connecting the inlet line to outside of the tire.

14. The tire of claim 11, wherein the tire is a component of a self-inflating tire system further comprising a receiver and a tire pressure monitoring system, the tire pressure monitoring system is configured to monitor a pressure of the fluid disposed in the interior space of the tire, and the receiver is configured to receive signals from the tire pressure monitoring system and to selectively actuate the at least three valve assemblies.

15. A self-inflating tire assembly, comprising:
a tire having:
- an inner shell defining a hollow interior space,
- an outer shell disposed radially outward from the inner shell,
- at least one pump assembly having a tube portion, wherein the at least one pump assembly is selectively actuatable between an expanded state in which the tube portion extends radially outward beyond the outer shell and a compressed state in which the tube portion does not extend radially outward beyond the outer shell, and
- at least one valve assembly coupled to the at least one pump assembly by a plurality of conduits, wherein the at least one valve assembly is configured to selectively direct fluid from the at least one pump assembly, through a first conduit, and to the interior space of the inner shell and from the interior space of the inner shell, through a second conduit, and to the at least one pump assembly and to selectively actuate the at least one pump assembly between the expanded state and the compressed state,
- wherein the tube portion includes a pinch point such that when the at least one valve assembly is actuated, the tire's engagement with a road surface compresses the tube portion and forces the fluid out of a forward outlet of the tube portion ahead of the pinch point and causes a compressed portion of the tube portion rearward of the pinch point to expand and create a vacuum that draws the fluid into the tube portion through the at least one valve assembly.

16. The assembly of claim 15, further comprising:
- a tire pressure monitoring system configured to monitor a pressure of a fluid disposed in the interior space of the tire and to transmit signals; and
- a receiver configured to receive the signals transmitted from the tire pressure monitoring system and to selectively actuate the at least one valve assembly of the tire.

17. The assembly of claim 16, further comprising a sensor configured to transmit the signals, wherein the receiver is further configured to receive the signals transmitted from the sensor.

18. The assembly of claim 15, wherein the at least one valve assembly is disposed radially between the inner shell and the outer shell.

* * * * *